United States Patent
Morgan et al.

(10) Patent No.: US 9,572,195 B2
(45) Date of Patent: Feb. 14, 2017

(54) LINK SHARING WITHIN A COMMUNICATION SYSTEM

(75) Inventors: William K. Morgan, Wauconda, IL (US); William P. Alberth, Prairie Grove, IL (US); Daniel J. Declerck, Lake Barrington, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 102 days.

(21) Appl. No.: 13/195,963

(22) Filed: Aug. 2, 2011

(65) Prior Publication Data

US 2013/0034020 A1   Feb. 7, 2013

(51) Int. Cl.
| | | |
|---|---|---|
| *H04W 88/04* | (2009.01) | |
| *H04W 84/14* | (2009.01) | |
| *H04W 88/12* | (2009.01) | |
| *H04W 84/12* | (2009.01) | |
| *H04W 88/06* | (2009.01) | |

(52) U.S. Cl.
CPC ............. *H04W 84/14* (2013.01); *H04W 84/12* (2013.01); *H04W 88/04* (2013.01); *H04W 88/06* (2013.01)

(58) Field of Classification Search
CPC ...... H04W 84/22; H04W 84/18; H04W 88/04; H04W 84/12; H04W 84/14; H04W 88/06; H04L 12/28
USPC .......................................... 370/255, 229–235
See application file for complete search history.

(56) References Cited

U.S. PATENT DOCUMENTS

| | | | |
|---|---|---|---|
| 7,478,126 B2 | 1/2009 | Prohel et al. | |
| 7,593,376 B2 * | 9/2009 | D'Amico et al. | ............ 370/338 |
| 2004/0033778 A1 * | 2/2004 | Fonseca, Jr. | ......... H04B 7/2606 |
| | | | 455/11.1 |
| 2004/0116141 A1 * | 6/2004 | Loven et al. | .................. 455/519 |
| 2008/0008094 A1 * | 1/2008 | Gilfix | ................... H04L 67/125 |
| | | | 370/235 |
| 2010/0027426 A1 * | 2/2010 | Nair et al. | ..................... 370/238 |
| 2010/0166170 A1 | 7/2010 | East | |
| 2010/0250135 A1 | 9/2010 | Li et al. | |

(Continued)

FOREIGN PATENT DOCUMENTS

| | | |
|---|---|---|
| CN | 1723677 | 1/2006 |
| CN | 1736041 | 2/2006 |

(Continued)

OTHER PUBLICATIONS

MiFi® 4082—IntelligentMobile Hotspot, www.novatelwireless.com/index.php?, downloaded from internet May 11, 2011, all pages.

(Continued)

*Primary Examiner* — Andrew Lai
*Assistant Examiner* — M Mostazir Rahman
(74) *Attorney, Agent, or Firm* — IP Spring

(57) ABSTRACT

A method and apparatus for choosing members of a local-area network and choosing a network coordinator among the members is provided herein. During operation a mobile node will determine presence information for nodes within its local area. These nodes will be solicited by the node to be part of a local-area network. Of all nodes that accept the request to form a local area network, a network coordinator for the local-area network will be chosen by determining which node's data budget allows for the cheapest transfer of data. The node with the best data budget is then chosen to be a network coordinator.

17 Claims, 4 Drawing Sheets

(56) References Cited

U.S. PATENT DOCUMENTS

2010/0257239 A1   10/2010  Roberts
2010/0284388 A1*  11/2010  Fantini et al. ................ 370/338
2010/0317392 A1   12/2010  Davis
2011/0143667 A1    6/2011  Cugnni

FOREIGN PATENT DOCUMENTS

CN      101940036         1/2011
EP        1617605 A1      1/2006
EP        2200371 A2 *    6/2010  ............ H04W 40/10

OTHER PUBLICATIONS

European Patent Office; Related PCT/US2012/047822 International Search Report (dated Feb. 7, 2013), Written Opinion (dated Feb. 2, 2014) and International Preliminary Report on Patentability (dated Feb. 4, 2014); published Feb. 7, 2013; 17 pages.
KIPO; Related Korean Patent Application 10-201407002492; Notice of Preliminary Rejection dated Feb. 10, 2015; Korean Language and English Translation; 9 Pages.
KIPO. Notice of Final Rejection (including translation) for Related Korean Patent Application No. 10-2014-7002492. 8 pages. Aug. 26, 2015.
"Chinese First Office Action", Chinese Application No. 201280038504.1, Sep. 21, 2016, 13 pages.

* cited by examiner

Prior-Art
100

200

300

LINK SHARING WITHIN A COMMUNICATION SYSTEM

FIELD OF THE INVENTION

The present invention relates generally to sharing a communication link among communication devices and in particular, to method and apparatus for choosing members of a local-area network and choosing a network coordinator among the members.

BACKGROUND OF THE INVENTION

Modern cellular data communication has additional overhead signaling beyond traditional wireline data communication. For every bearer data transmission whether it is one byte or many megabytes, many signaling messages need to be exchanged to set up the RF traffic channel before the actual data transfer can occur. For example, with certain carriers it takes a dozen or so messages to get a channel set up before a data transfer can even begin. Additionally, modern cellular technologies employ data schedulers in the base stations for both uplink and downlink data. The schedulers require periodic input from each user which is sent over the cellular RF link. Multiply all that signaling up for N users and it begins to cut into the RF capacity of the network available for bearer transfers. Worse yet, any individual user may be bringing the RF link up and down for small transfers associated with social media.

A proposed hybrid-cellular network (HCN) seeks to alleviate the limitations of traditional cellular systems by allowing uplink and downlink connections to involve more than one link, with all links utilizing (i.e., passing through) a node serving as a network coordinator. Such a system is shown in FIG. 1. As shown in FIG. 1, multiple nodes 102 and 103 are in communication with base station 101. However, instead of each node in the system forming its own cellular air interface link 105, nodes 102 and 103 may choose a network coordinator, or access point 103 to use as a communication link to/from base station 101. This process involves setting up a local network among devices 102 and 103. Communication among devices 102 and 103 take place via local air interface 104 (e.g., an IEEE 802.11 air interface). Such a system is a hybrid between cellular and local network architectures, where uplink and/or downlink data is relayed to and from network coordinator 103 by other mobile units.

While hybrid-cellular networks alleviate network congestion, a problem exists in organizing such networks. For example, nodes within communication system 100 will need to choose local-area network members. These nodes will also need to choose a network coordinator among the network nodes. Therefore a need exists for a method and apparatus for choosing members of a local-area network and choosing a network coordinator among the members.

Figure 1:
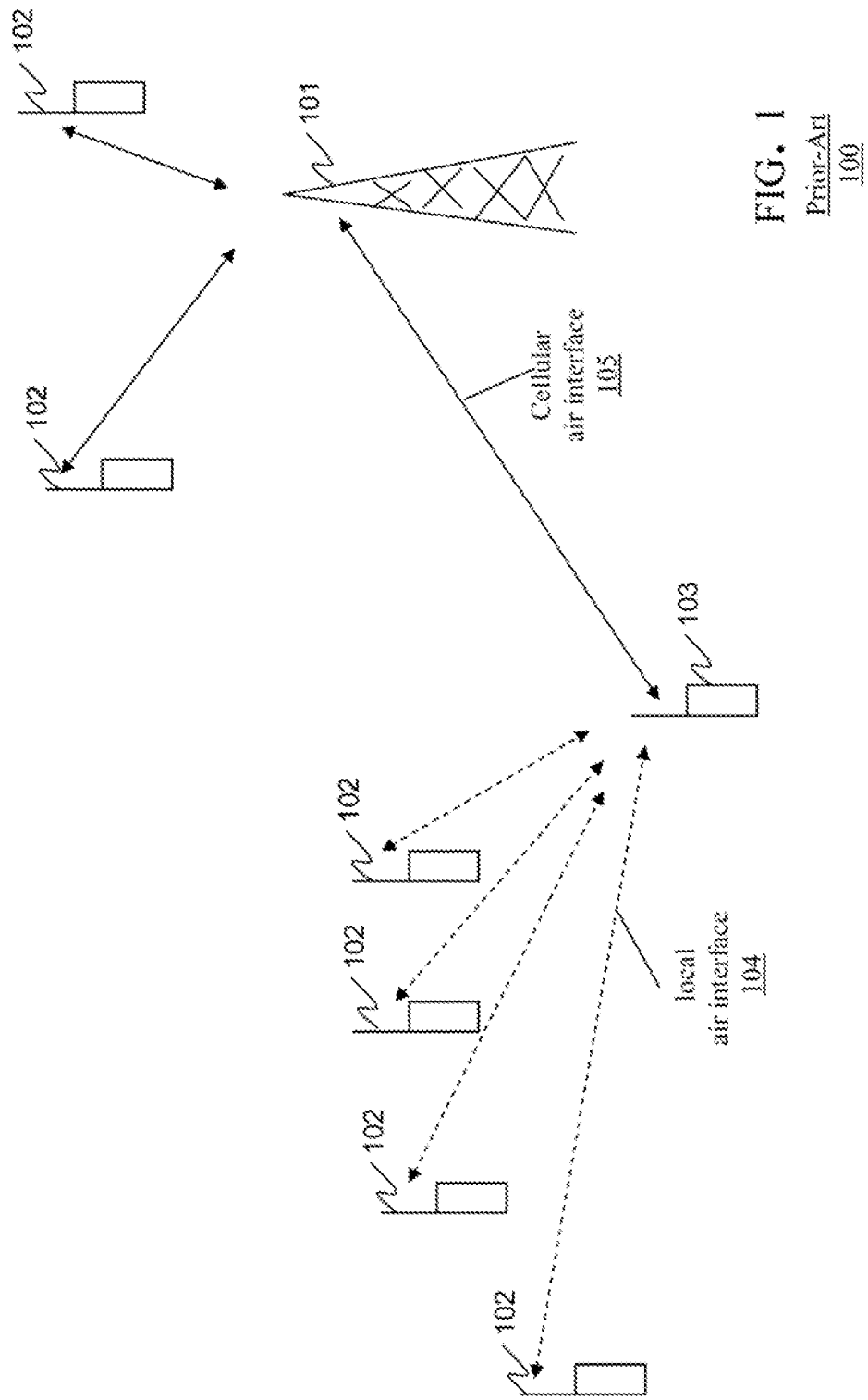
FIG. 1 is a block diagram of a prior-art hybrid-cellular network.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for choosing members of a local-area network and choosing a network coordinator among the members is provided herein. During operation a mobile node will determine presence information for nodes within its local area. These nodes will be solicited by the node to be part of a local-area network. Of all nodes that accept the request to form a local area network, a network coordinator for the local-area network will be chosen by determining which node's data budget allows for the cheapest transfer of data. The node with the best data budget is then chosen to be a network coordinator.

In an alternate embodiment of the present invention, a node forming a local-area network may determine if any nodes in the area are "friends" within a particular social network. This may be accomplished by simply locally storing identities of "friends", or alternatively by accessing a social network database to determine identities of friends. Only friends will be solicited to become part of the local-area network.

The above technique easily allows the formation of a local-area network within a hybrid-cellular network. The formation of the local-area network will help alleviate network congestion. Additionally, by choosing a network coordinator as described, the nodes that become members of the local-area network can more cheaply transfer data within the hybrid-cellular network.

The present invention encompasses a method for link sharing within a communication system. The method comprises the steps of determining nodes that wish to form a local-area network, determining a data budget for each node wishing to form the local-area network, and choosing a network coordinator based on the data budget for each node wishing to form the local-area network.

The present invention additionally encompasses an apparatus for link sharing within a communication system. The apparatus comprises logic circuitry determining nodes that wish to form a local-area network, determining a data budget for each node wishing to form the local-area network, and choosing a network coordinator based on the data budget for each node wishing to form the local-area network.

Figure 2:
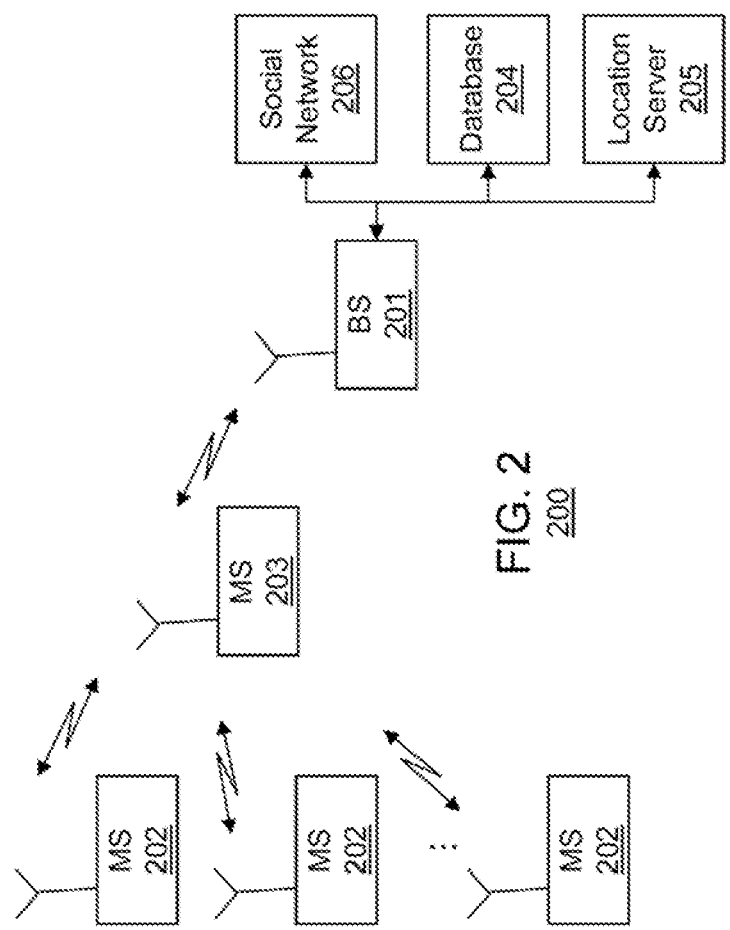
FIG. 2 is a block diagram of a hybrid-cellular network.

Turning now to the drawings, where like numerals designate like components, FIG. 2 is a block diagram of hybrid-cellular network 200. As shown, multiple mobile station nodes 202 and 203 are in communication with base station 201. However, instead of each node in the system forming its own cellular air interface link to base station 201, nodes 202 and 203 choose network coordinator 203 to use as a communication link to/from base station 201. (The mobile stations can also be referred to as User Equipment (UE)). This process involves setting up a local network among devices 202 and 203. Communication among devices 202 and 203 take place via a local air interface (e.g., an IEEE 802.11 air interface, or another suitable short range data connection).

As discussed above, while hybrid-cellular networks alleviate network congestion, a problem exists in organizing such networks. For example, nodes within communication system 200 will need to choose local-area network members. These nodes will also need to choose a network coordinator among the network nodes. In order to address this issue, each node within communication system 200 will determine other nodes that are near (e.g., 100 feet). Location server 205 is provided for this purpose. Nodes 202 and 203 are initially in direct contact with base station 201. While in contact with base station 201, the nodes register with server 205 and periodically provide GPS location updates along with identification information (e.g., a WIFI system identification (SSID)), and an encryption key (such as a WEP and/or WPA key). When the server 205 is aware that 2 or more nodes are near each other, server 205 supplies them with a list of nearby nodes and their respective identifications and Keys to facilitate communication between the nodes in proximity. In an alternate embodiment of the present invention, all nodes search for nodes by broadcasting of a predefined message and listening for a response.

Once neighbor awareness is established, nodes can accept or reject other nodes for network formation through a screening process. The nodes can be configured to accept from any user or screen based off of family and friend plan status or social media friend status. As described above, when a node is accepting network formation based on social media status (e.g., wither or not neighboring nodes are "friends' within a social network), social network 206 may be contacted to determine a "friends" list. Based on this list, nodes may be accepted or rejected for network formation.

Once neighbor node awareness is established a router/relay node (referred to above as a network coordinator) needs to be determined. This can accomplished by different criteria. Nodes can exchange messages to arrive at a vote amongst themselves to see who is the best candidate to serve as the router/relay node. This can be based off of downlink received signal quality, prior throughput history, remaining battery charge state, etc, but preference is given to the node having a best data budget.

The above-described communication system allows for nodes from different carriers to form a hybrid network or nodes with poor antenna/receiver structures to get data coverage in marginal areas. A node on a different carrier that is out of coverage could now get cellular data coverage via his/her friends as well as a node on the same carrier with poor cellular sensitivity.

The host selection process is carried out through local area network message exchange. Each node sends metric(s) info in a "host metric info" message to all already identified neighbors. A metric can be any number of items such as the data budget value, signal quality, throughput, battery life, etc Each node calculates a score for itself and each of its neighbors. The scores are a weighted combination of the provided metrics. For a simple one metric case, the weigh factor is 1. Upon receiving "host metric info ACKs" back from all neighbors its aware of, the node with the best or tied for the best score broadcasts this fact via a rank ordered N scores list to all neighbors in a "Potential host" message. If there are no ties, then the one node is declared the local area host. To handle the case of an N way tie, each node includes a tie breaker field in the "potential local area host" message. This field is a randomly generated number seeded with the nodes ESN or IMEI. The node with the lowest tie breaker field is declared the local area host.

Determining a Data Budget Among Nodes:

In one embodiment of the present invention, a data budget is a cost of continued data use that would be reflected in one's cellular phone bill. Someone with an unlimited plan would have a cost of zero, someone with no cellular service due to no coverage would have an infinite cost. Someone out of minutes in their current pricing tier would specify an amount of data in the next pricing tier. Each node provides a cost number which represents their cost of continued data use. The nodes can either track their remaining data budgets internally or query the network for remaining data usage at current pricing.

Alternatively, the data budget could be defined as a number of bytes transferred in a fixed amount of recent time (e.g., the last 10 seconds). This number gives a representation of a recent sustained throughput over several seconds, for example, 10 MB/second over the last 10 seconds. An active data user with the best sustained throughput would be the user chosen to take on the roll of coordinator.

Figure 3:
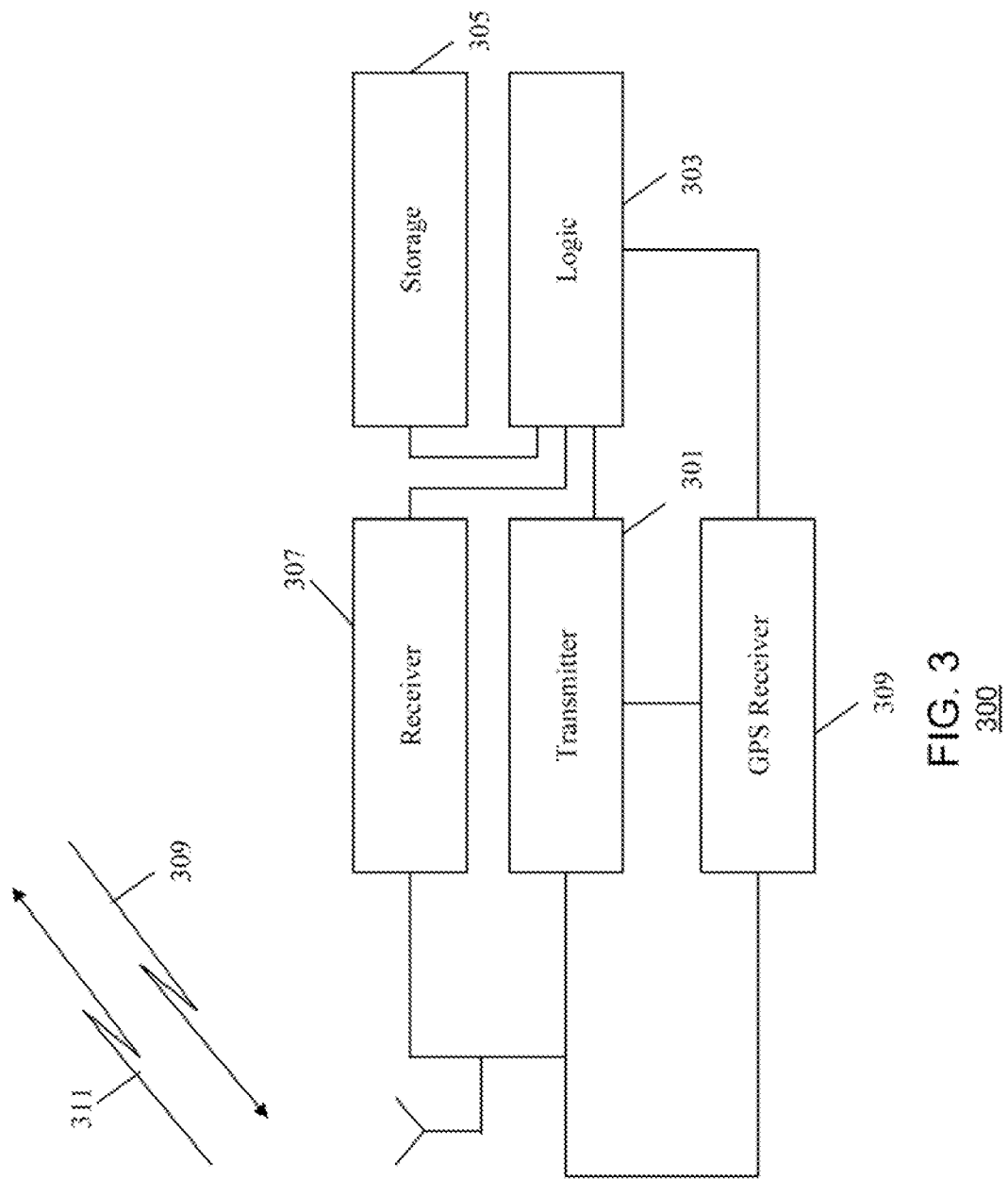
FIG. 3 is a block diagram of a node within a hybrid-cellular network.

FIG. 3 is a block diagram of mobile unit 300. As shown, mobile unit 300 comprises transmitter 301, receiver 307, storage 305, and logic circuitry 303. As discussed above, transmitter 301 and receiver 307 are designed to operate over both a cellular air interface (e.g., GSM, CDMA, WCDMA, . . . , etc.) and an ad-hoc networking air interface (e.g., BLUETOOTH, 802.11, . . . , etc.). As one of ordinary skill in the art will recognize, typically the cellular air interface (utilizing a cellular over-the-air protocol) serves long-range communication, while the ad-hoc air interface (utilizing an ad-hoc over-the-air protocol) serves short-range communication. Logic circuitry 303 comprises hardware such as a digital signal processor (DSP), general purpose microprocessor, a programmable logic device, or application specific integrated circuit (ASIC) and is utilized to control node 300. Finally, storage 305 comprises standard random access memory and is used to store information related to neighboring nodes (identities, encryption keys) along with information that may need to be relayed.

While remote unit 300 is acting as a relay, it is continuously receiving transmissions 309 from another remote unit utilizing the ad-hoc air interface and relays (prior to, or after, buffering via storage 305) these transmissions to infrastructure equipment via uplink communication signal 311 utilizing the cellular air interface. Similarly, when remote unit 300 is relaying communication through another remote or mobile unit, remote unit 300 is generally receiving downlink communications over the cellular air interface and transmitting uplink communications to another remote unit via the ad-hoc air interface.

During operation, logic unit 303 registers with server 205 and periodically provide GPS location updates (received from GPS receiver 209) along with identification information (e.g., a WIFI system identification (SSID)), and an encryption key (such as a WEP and/or WPA key). Additionally, receiver 307 periodically receives identification information from server 205 from other nodes in its vicinity. Once the identities of other nodes in its vicinity are received, logic circuitry 303 may access social network 206 to determine if any social-network friends are near. This criteria may be used when deciding members to participate in the ad-hoc network. Regardless of the criteria used to determine nodes to poll for network formation, logic circuitry 303 will instruct transmitter 301 to send "join" messages to other nodes. All nodes wishing to join the local network share information with each other regarding their identification and ability to act as a relay. In particular, for ad-hoc networking utilizing the BLUETOOTH standard, when a node the inquiry, it responds with its address and timing information to enable future communications. In the present invention the standby device will also provide information on its data budget.

When finished, all nodes wishing to participate in the local network will have identified a list of nearby nodes that can serve as relay devices through an ad hoc interface, along with the data budget of these nodes. Logic circuitry 303 then rank-orders the data budgets to choose a relay candidate that will result in the best system performance, which in this case comprises a relay device that has a minimum data budget. In particular, those nodes with low relay costs will be chosen over those nodes with higher relay costs. Network formation then takes place with the node having a lowest data budget acting as a network coordinator.

Figure 4:
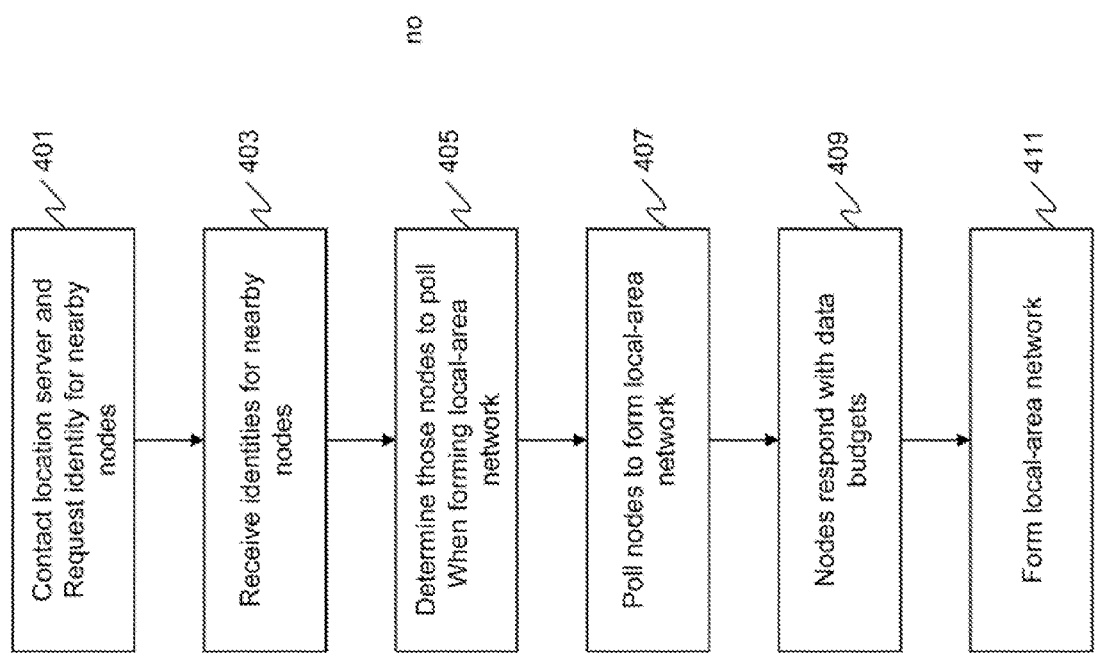
FIG. 4 is a flow chart showing operation of the node of FIG. 3 when choosing local-area network members.

FIG. 4 is a flow chart showing operation of the node of FIG. 3 when choosing local-area network members. In particular, the steps of FIG. 4 show those steps needed to determine nodes that wish to form a local-area network and then choose a network coordinator for the local-area network. The logic flow begins at step 401 where logic circuitry 303 contacts location server 205 and requests identities for nearby nodes. In response at step 403, receiver 307 receives communications from server 205 identifying nearby nodes. In particular, server 205 provides all nearby nodes identifications and Keys to facilitate communication between the nodes in proximity. This information may be stored in storage 305. At step 405 logic circuitry 303 determines those nodes that it wishes to poll when forming a local-area network. In one embodiment logic circuitry 303 simply polls all local nodes. In another embodiment, logic circuitry 303 contacts social network 206 to determine if any social-network friends are near. Only social network friends will be polled to form a network. Alternatively, social network 206 may not need to be contacted if the information provided by social network 206 is stored locally in storage 305. Thus, node 300 may have, at an earlier time, been provided with a list of social-network friends, and stored the list of social-network friends.

Once all nodes to be polled are determined, the logic flow continues to step 407 where the nodes are polled. As part of the polling process, logic circuitry 303 provides a data budget to the polled nodes. Those nodes wishing to be part of the network respond with their data budgets (step 409). Finally, at step 411 logic circuitry for all nodes wishing to join the network choose a network coordinator, and the network is formed. As discussed above, the network coordinator preferably has the lowest data budget. In case of ties, a node is chosen randomly from the tied nodes. Thus, at step 411 logic circuitry 303 chooses a network coordinator based on the data budget for each node wishing to form the local-area network. As discussed above the network coordinator acts as a data relay between a local-area network and a wide-area network. The wide-area network preferably comprises a cellular communication system.

While the invention has been particularly shown and described with reference to a particular embodiment, it will be understood by those skilled in the art that various changes in form and details may be made therein without departing from the spirit and scope of the invention. It is intended that such changes come within the scope of the following claims:

The invention claimed is:

1. A method, at a logic circuitry of a first node that wishes to form a local-area network, for link sharing within a communication system, the method comprising a processor performing the steps of:

determining a plurality of other nodes that wish to form the local-area network;

sending first host metric information for the first node to each of the plurality of other nodes, wherein the first host metric information for the first node includes, at least in part, a measure of cost associated with data transfer with a wide-area network based, at least in part, on a data plan of the respective node;

receiving other host metric information from each respective node of the plurality of other nodes, wherein the other host metric information includes, at least in part, a measure of cost associated with data transfer with a wide-area network based, at least in part, on a data plan of the respective node;

determining a user data cost score for each of the plurality of other nodes and the first node, wherein the user data cost score is based on the other host metric information and the first host metric information;

ranking the user data cost scores of each of the plurality of nodes and the first node; and determining a network coordinator from the plurality of other nodes and the first node to use as a communication link with the wide-area network by receiving a potential host message from at least one of the plurality of other nodes, wherein the potential host message is based, at least in part, on a high ranking of the user data cost score for the respective at least one of the plurality of other nodes, wherein the network coordinator acts as a data relay access point through which the plurality of other nodes and the first node route data between the local-area network and the wide-area network.

2. The method of claim 1 wherein the wide-area network comprises a cellular communication system.

3. The method of claim 1 wherein the first host metric information and the other host metric information are further based, at least in part, on a measure of sustained throughput of data.

4. The method of claim 1 wherein the step of determining the plurality of other nodes that wish to form a local-area network comprises the steps of:

determining nearby social-network friends;

polling the nearby social-network friends to join the local-area network; and determining the plurality of other nodes that wish to form the local-area network from the nearby social-network friends that wish to join the local-area network.

5. The method of claim 1 wherein the step of determining the plurality of other nodes that wish to form a local-area network comprises the steps of:

determining nearby nodes;

polling the nearby nodes to join the local-area network; and determining the plurality of other nodes that wish to form the local-area network from the nearby nodes that wish to join the local-area network.

6. The method of claim 1 wherein choosing the network coordinator is further by receiving a randomly generated tie breaker indicator for each of the at least one of the plurality of nodes from which the potential host message is received.

7. An apparatus for link sharing within a communication system, the apparatus comprising:
 logic circuitry to form a local-area network, the logic circuitry configured to:
  determine a plurality of other nodes that wish to form the local-area network;
  send first host metric information for the apparatus to each of the plurality of other nodes, wherein the first host metric information includes, at least in part, a measure of cost associated with data transfer with a wide-area network based, at least in part, on a data plan of the respective node;
  receive other host metric information from each respective node of the plurality of other nodes, wherein the other host metric information and first host metric information include, at least in part, a measure of cost associated with data transfer with a wide-area network based, at least in part, on a data plan of the respective node;
  determine a user data cost score for each of the plurality of nodes and the apparatus, wherein the user data cost score is based on the host metric information;
  rank the user data cost scores of each of the plurality of nodes and the apparatus; and
  determine a network coordinator from the plurality of other nodes and the apparatus to use as a communication link with the wide-area network by receiving a potential host message from at least one of the plurality of other nodes, wherein the potential host message is based, at least in part, on a high ranking of the user data cost score for the at least one of the plurality of other nodes,
  wherein the network coordinator acts as a data relay access point through which the plurality of nodes and the apparatus route data between the local-area network and the wide-area network.

8. The apparatus of claim 7 wherein the wide-area network comprises a cellular communication system.

9. The apparatus of claim 7 wherein the first host metric information and the other host metric information are further based, at least in part, on a measure of sustained throughput of data.

10. The apparatus of claim 7 wherein the step of determining nodes that wish to form a local-area network comprises the steps of:
 determining nearby social-network friends;
 polling the nearby social-network friends to join the local-area network; and
 determining the nodes that wish to form the local-area network from the nearby social-network friends that wish to join the local-area network.

11. The apparatus of claim 7 wherein the step of determining nodes that wish to form a local-area network comprises the steps of:
 determining nearby nodes;
 polling the nearby nodes to join the local-area network; and
 determining the nodes that wish to form the local-area network from the nearby nodes that wish to join the local-area network.

12. The apparatus of claim 7 wherein choosing the network coordinator is further by receiving a randomly generated tie breaker indicator for each of the at least one of the plurality of nodes from which the potential host message is received.

13. A method, at a logic circuitry of a first node in a communication system, for link sharing within the communication system, the method comprising a processor performing the steps of:
 determining a plurality of other nodes in a proximity;
 receiving from the plurality of other nodes an indication of acceptance or rejection through a screening process;
 forming a local-area network of accepted nodes of the plurality of other nodes and the first node, wherein the accepted nodes have received an indication of acceptance from the plurality of other nodes in the proximity and the first node;
 determining a user data cost score for each of the accepted nodes and the first node, wherein the user data cost score comprises a measure of cost associated with data transfer with a wide-area network based, at least in part, on a data plan and at least one of: signal quality, throughput, and battery life for the node;
 ranking the user data cost scores of each of the accepted nodes and the first node; and
 determining a network coordinator from the accepted nodes and the first node to use as a communication link with the wide-area network by receiving a potential host message from at least one of the accepted nodes, wherein the potential host message is based, at least in part, on a high ranking of the user data cost score for the at least one of the accepted node,
 wherein the network coordinator acts as a data relay access point through which the accepted nodes and the first node route data between the local-area network and the wide-area network.

14. The method of claim 13 wherein the data plan is a family and friends plan.

15. The method of claim 13 wherein the indication of acceptance or rejection of the nodes is based, at least in part, on social media status of the nodes.

16. The method of claim 15, further including obtaining the social media status from a social network.

17. The method of claim 13 wherein choosing the network coordinator is further by receiving a randomly generated tie breaker indicator for each of the at least one of the accepted nodes from which the potential host message is received.

* * * * *